United States Patent
Ayres et al.

(10) Patent No.: US 6,404,333 B1
(45) Date of Patent: Jun. 11, 2002

(54) GAUGE INSTRUMENT FOR USE IN A MOTOR VEHICLE

(75) Inventors: Craig A. Ayres; John A. Ayres, both of Lapeer; Thomas Blossom, Imlay City, all of MI (US)

(73) Assignee: Invotronics Manufacturing, Lapeer, MI (US)

( * ) Notice: Subject to any disclaimer, the term of this patent is extended or adjusted under 35 U.S.C. 154(b) by 0 days.

(21) Appl. No.: 09/185,085

(22) Filed: Nov. 3, 1998

Related U.S. Application Data

(60) Provisional application No. 60/064,019, filed on Nov. 3, 1997.

(51) Int. Cl.$^7$ ................................................. B60Q 1/00
(52) U.S. Cl. ........................ 340/461; 362/487; 362/489; 116/62.1
(58) Field of Search .................... 340/461; 362/487, 362/489, 23; 116/62.1

(56) References Cited

U.S. PATENT DOCUMENTS

| | | |
|---|---|---|
| 2,886,911 A | 5/1959 | Hardesty |
| 3,267,598 A | 8/1966 | Olesen et al. |
| 4,257,084 A | 3/1981 | Reynolds |
| 4,258,643 A | 3/1981 | Ishikawa et al. |
| 4,621,306 A * | 11/1986 | Sell .............................. 362/29 |
| 4,831,366 A | 5/1989 | Iino |
| 4,882,659 A | 11/1989 | Gloudemans |
| 4,884,058 A | 11/1989 | Ide |
| 4,885,663 A | 12/1989 | Parker |
| 4,890,027 A | 12/1989 | Bohner et al. |
| 4,907,132 A | 3/1990 | Parker |
| 4,939,675 A | 7/1990 | Luitje |
| 4,959,759 A | 9/1990 | Kohler |
| 4,972,122 A | 11/1990 | Daidouji et al. |
| 4,988,944 A | 1/1991 | Ito et al. |
| 4,991,064 A | 2/1991 | Clem |
| 5,003,433 A | 3/1991 | Fournier |
| 5,013,947 A | 5/1991 | Ide |
| 5,703,612 A * | 12/1997 | Salmon et al. ................. 345/75 |
| 5,963,280 A * | 10/1999 | Okuda et al. ................. 349/65 |

FOREIGN PATENT DOCUMENTS

| | | |
|---|---|---|
| EP | 0006361 A1 | 1/1980 |
| EP | 0329110 A2 | 8/1989 |
| EP | 0414402 A1 | 2/1991 |
| JP | 55-0244404 | 2/1980 |
| JP | 61-003010 | 1/1986 |
| JP | 62-194234 | 8/1987 |

\* cited by examiner

Primary Examiner—Daryl Pope
(74) Attorney, Agent, or Firm—Clark Hill PLC

(57) ABSTRACT

An eyes up instrument having a transparent display is disclosed which is mountable on or above the dashboard of a vehicle to allow the instrument to be read by a vehicle operator without lowering his eyes to the vehicle instrument panel. The display of the instrument is transparent and therefore does not interfere substantially with the view of the operator. The compact design of the instrument and use of a miniature crossed coil gauge supported in the display itself allow it to be mounted unobtrusively on a dashboard even in applications where transparency is not required.

18 Claims, 8 Drawing Sheets

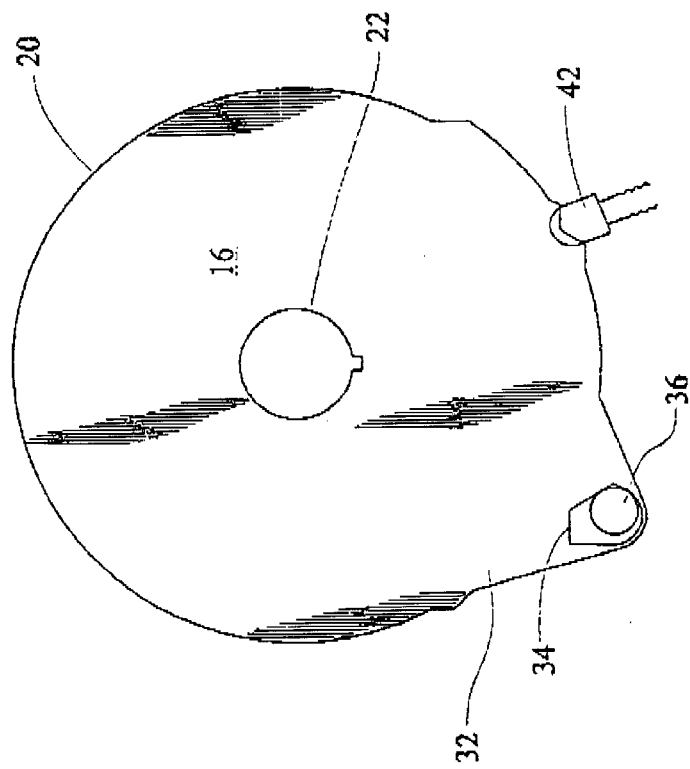
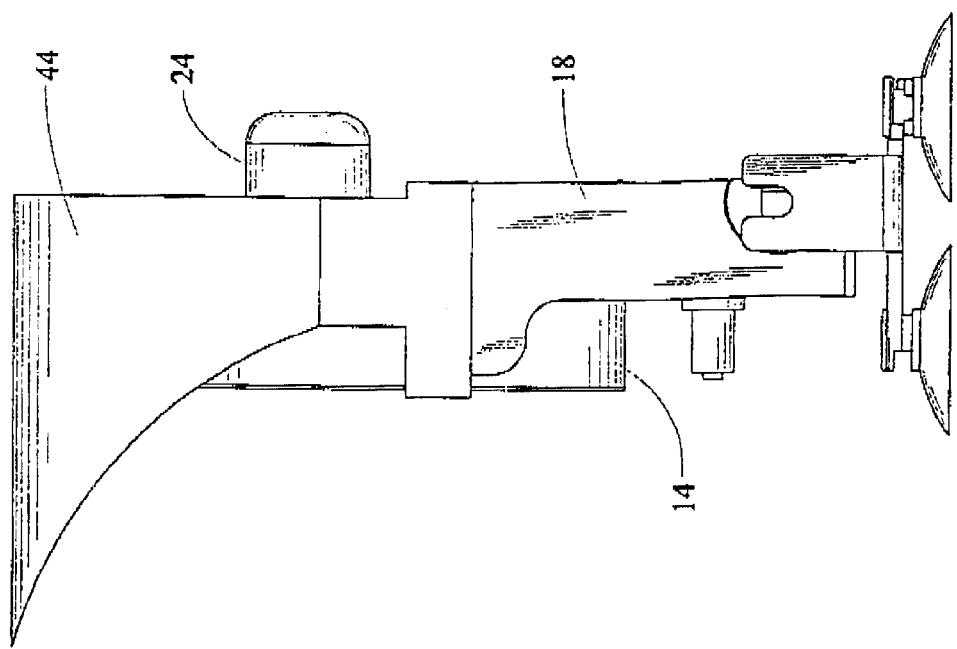

GAUGE INSTRUMENT FOR USE IN A MOTOR VEHICLE

The present invention is a continuation of U.S. Provisional Patent Application No. 60/064,019, filed Nov. 3, 1997, and priority based on this earlier application is claimed herein.

FIELD OF THE INVENTION

The present invention is directed toward a gauge-based instrument for use in a motor vehicle, and more specifically, toward a gauge-based instrument having a transparent display.

BACKGROUND OF THE INVENTION

Motor vehicles are generally equipped with a variety of instruments for providing information on the status of the vehicle. These instruments often include a speedometer for indicating the speed of the vehicle, a tachometer for showing the speed of the engine, and various other gauges for showing engine temperature and fluid levels, for example. Similar instrumentation is present on aircraft, boats, motorcycles and other vehicles. These instruments often include analogue gauges wherein a needle or pointer is mounted on the rotary output shaft of a gauge motor and assumes different positions based on the control signal received by the gauge. The needle is positioned near a display bearing markings relevant to the condition being measured, and the needle points to various marks as it turns. For example, if the gauge is part of a speedometer, the markings on the display will indicate various rates of speed in miles or kilometers per hour. Sensors measure the rate of speed of the vehicle and send signals proportional to that speed to the gauge causing the needle to point to the appropriate marking on the display.

Instrumentation must be visible to a person operating a vehicle, and many of the instruments must be read while the vehicle is in motion. A driver will generally focus on the road in front of him when driving, and thus the most convenient location for placing instrumentation has been directly below the driver's gaze, on the dashboard of the vehicle. The steering wheel is located between the driver and the instrumentation, and partially obstructs the driver's view of the dashboard. Furthermore, the most important instruments must be large enough for the driver to read and interpret quickly. A vehicle traveling at 60 miles per hour moves 88 feet per second. Thus a driver takes his eyes off the road for 88 feet every time he looks at an instrument for one second. If the instrumentation is small or cannot be read quickly, an even greater time will elapse. In addition, a person's eyes take a certain amount of time to adjust when shifting focus from a distant point to a proximate point, and a similar time elapses when attention is returned to the distant point. Changes in lighting between the interior and exterior of the vehicle can also make it difficult to switch focus between the road and the dashboard. A driver moving along a highway, for example, generally focuses on the vehicle in front of him or some other point many feet in front of his car. The instruments on a dashboard, meanwhile, are located perhaps one to two feet from the driver's eyes. The constant shifting of attention from the road to the instruments and the refocusing of eyes involved in this process can be distracting and had the potential to contribute to the occurrence of accidents.

One attempt to overcome this problem was the introduction of so-called "heads-up" displays. These displays use complex optics and controls to project an image of an instrument in front of the driver so that the instrument appears to hover in space somewhere over the hood of the vehicle. Similar technology is used in military aircraft. The price of such displays remains high, and therefore this feature is not generally available in average automobiles.

It would therefore be desirable to provide instrumentation that could be read by the driver of a vehicle in a minimal amount of time and with a minimal amount of distraction from driving, that was at the same time easy to use and install and more economical than typical "heads-up" displays.

SUMMARY OF THE INVENTION

These and other problems are addressed by the present invention which comprises a vehicle instrument with a transparent portion that can be placed in or near a driver's line of sight without interfering with his view, to allow the instrument to be read with a minimal amount of eye movement and with minimal distraction from the road. Because the instrument can be read without substantially lowering one's eyes, it may be referred to herein as an "eyes up" instrument or display. For simplicity, the subject invention will be described in terms of an instrument for use in an automobile; however, it could as easily be used in a truck, motorcycle, boat, airplane, or any other vehicle that includes instrumentation located generally in front of the driver. In a preferred embodiment, the subject invention comprises a gauge mounted in a clear display with translucent or partially opaque markings and a pointer connected to the gauge for pointing to the markings on the display in a well-known manner. Significantly, such a display can be mounted on the dashboard of a vehicle in a location that would normally interfere with a driver's view, but because the display is transparent, the driver can readily look through the instrument or ignore it until such time as it become necessary to take another reading. In this manner, the benefits of a heads-up display are obtained at a fraction of the cost. In a second embodiment, the same general instrument design is used, but the display is enclosed within a housing so that a driver cannot look through the instrument to the road beyond. However, due to the compact size of the display produced in accordance with this invention, and the method of illuminating the display from one edge and/or from beneath, low profile gauges can be provided for mounting on a dashboard so as not to interfere with a driver's vision. These low profile gauges may be located closer to the driver's line of sight than instruments mounted in a dashboard in a traditional manner and thus provide many of the advantages of the first embodiment of the invention. In accordance with another aspect of the invention, thin screens are molded into the display or attached to the front or rear of the display in order to control the angle at which light leaves the display to minimize unwanted reflection off the windshield.

It is therefore a principal object of the present invention to provide improved instrumentation for vehicles.

It is another object of the invention to provide instrumentation that can be viewed by the driver of a vehicle with minimal eye movement.

It is a further object of the invention to provide transparent instrumentation that can be placed in or near the line of sight of a driver.

It is still another object of the invention to provide instrumentation mounted at or above the dashboard level in a vehicle.

It is still a further object of the invention to provide illuminated instrumentation having a transparent display.

It is yet another object of the invention to provide an instrumentation cluster of the foregoing character.

It is yet a further object of the invention to provide instrumentation having a display that can be readily configured with a variety of different markings.

BRIEF DESCRIPTION OF THE DRAWINGS

These and other objects of the invention will be better understood from a reading and understanding of the following detailed description of several preferred embodiments of the invention together with the accompanying drawings of which:

FIG. 3 is a side elevational view of the instrument shown in FIG. 1 with an optional hood attached thereto;

FIG. 4 is a top plan view of a transparent display for use in the instrument of FIG. 2;

DETAILED DESCRIPTION OF THE PREFERRED EMBODIMENTS

Figure 1:
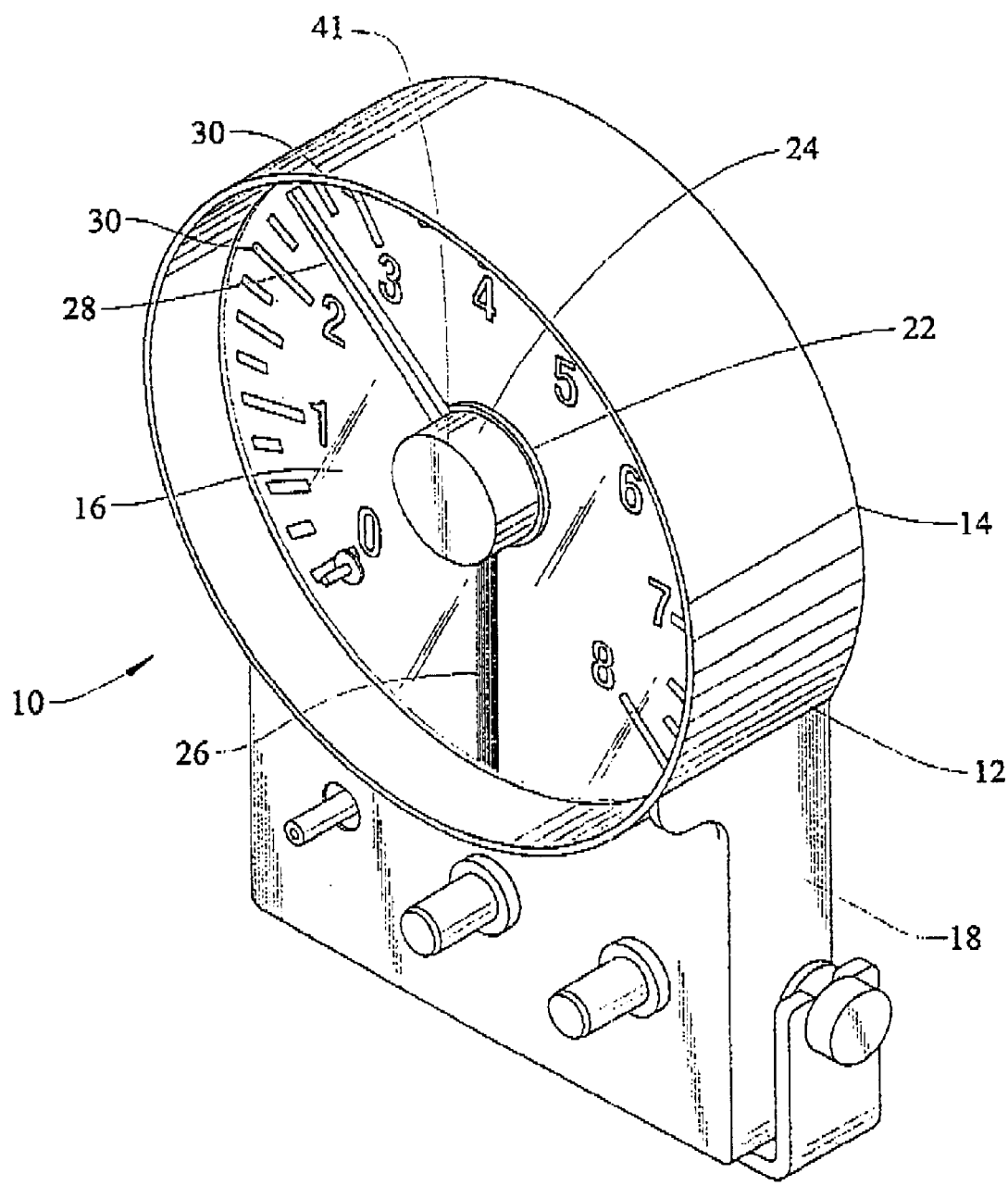
FIG. 1 is a perspective view of an instrument constructed in accordance with the present in invention.
Figure 2:
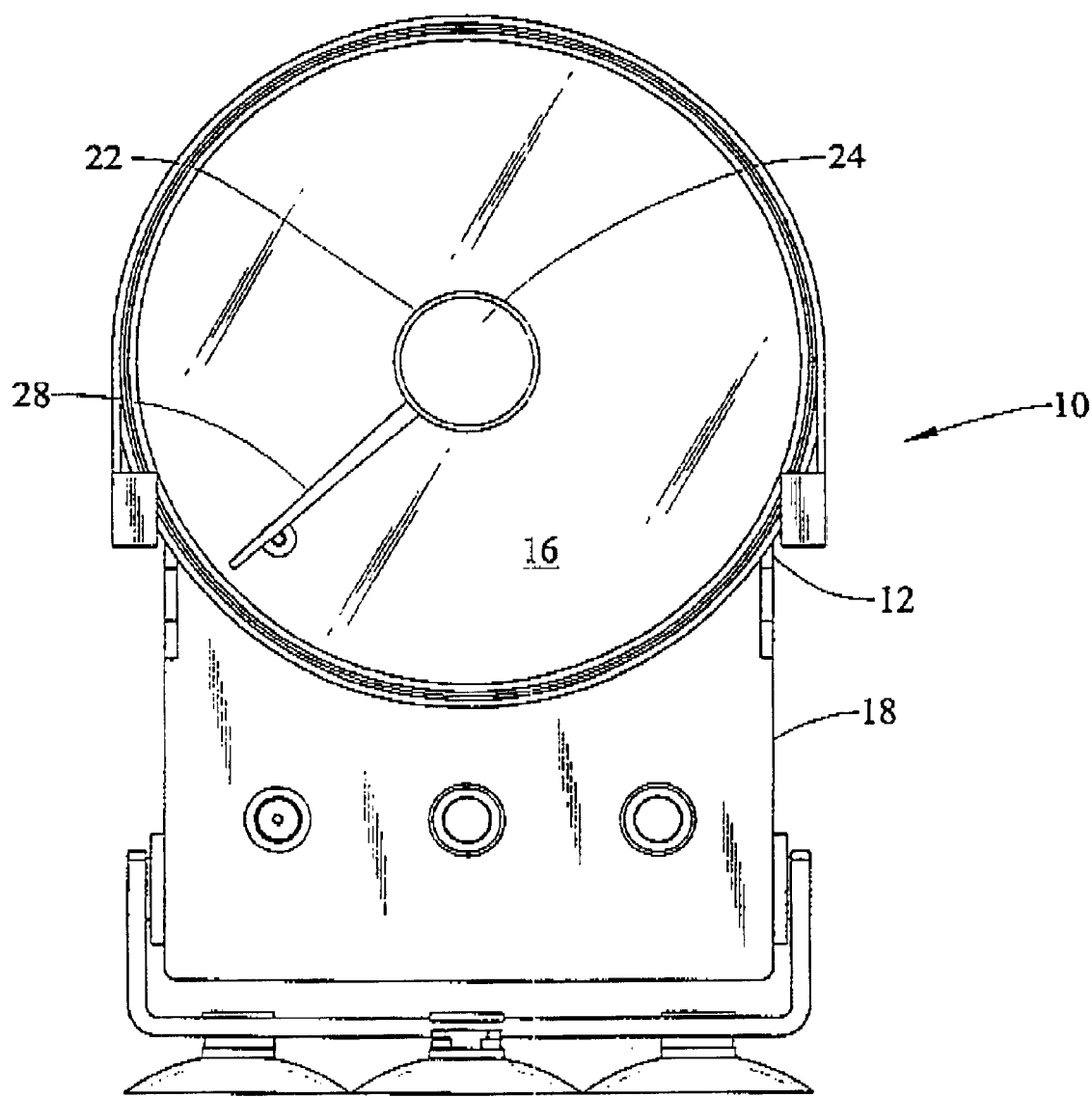
FIG. 2 is a front elevational view of the instrument shown in FIG. 1.

Referring now to the drawings, wherein the showings are for the purpose of illustrating several preferred embodiments of the subject invention only and not for the purpose of limiting same, FIGS. 1 and 2 show an instrument 10 (in this case, a tachometer) comprising a housing 12 having an upper portion 14 for holding a transparent display 16 and a lower portion 18 for holding control circuitry (not shown). Display 16, which is shown by itself in FIG. 4, comprises a sheet of transparent material such as acrylic or polycarbonate and has an outer edge 20 and a central opening 22. A miniature crossed-coil gauge 24, such as the gauge shown and described in U.S. Pat. No. 5,868,832, which is incorporated herein by reference, and is available from Invotronics Manufacturing of Lapeer, Mich., is mounted in opening 22 and connected to control circuitry in housing lower portion 18 using flexible connector 26. A pointer 28 is mounted to rotate with gauge 24 and travels over display 16 as the gauge turns. The instrument can be used in a variety of settings, however it is particularly well adapted for use on the dashboard of a vehicle because the transparent display does not interfere substantially with a driver's view, and therefore, the instrument can be mounted closer to a driver's line of sight than was previously practical.

Display 16 is provided with various markings 30, which markings may include numerals or hash marks, around the periphery thereof which serve as points of reference over which pointer 28 travels while being turned by gauge 24. The markings are painted or screen-printed on the back of display 16 and are visible to a person viewing the instrument from the front. Under daylight conditions especially, the driver can see through the instrument and needs to shift focus only briefly to take a reading of the instrument.

Figure 8:
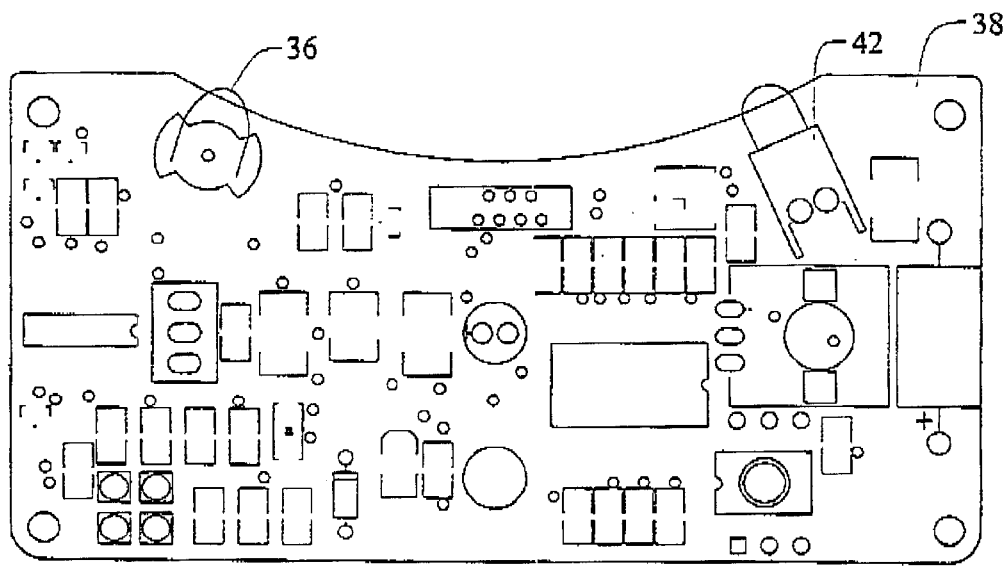
FIG. 8 is a top plan view of a circuit board used in practicing the subject invention.

The instrument can also be illuminated so that it can be seen in the dark. The method of illuminating the display can be understood with reference to FIG. 4 which shows display 16 removed from housing 12. Display 16 includes a projection 32 having an opening 34 which projection extends downwardly into lower portion 18 of housing 12 toward a light source such as light bulb 36 mounted to a circuit board 38, shown in FIG. 8, in the lower housing. The light bulb is placed in close proximity to opening 34 so that light emitted by the bulb travels through the edges of the opening and into display 16 where it is reflected throughout the interior of the display. Markings 30 printed on display 16 cause light to be emitted from the display in the shape of the markings making these markings visible to a viewer at night.

Gauge 24 further includes a second light source, such as LED 40 mounted near the pointer for illuminating the pointer in a well known manner. This LED is mounted under the gauge motor housing 41 and is powered by current that travels through flexible connection 26 from the lower part of housing 18. Preferably, LED 40 is a different color from light bulb 36 so that the pointer stands out against markings 30.

Figure 9A:
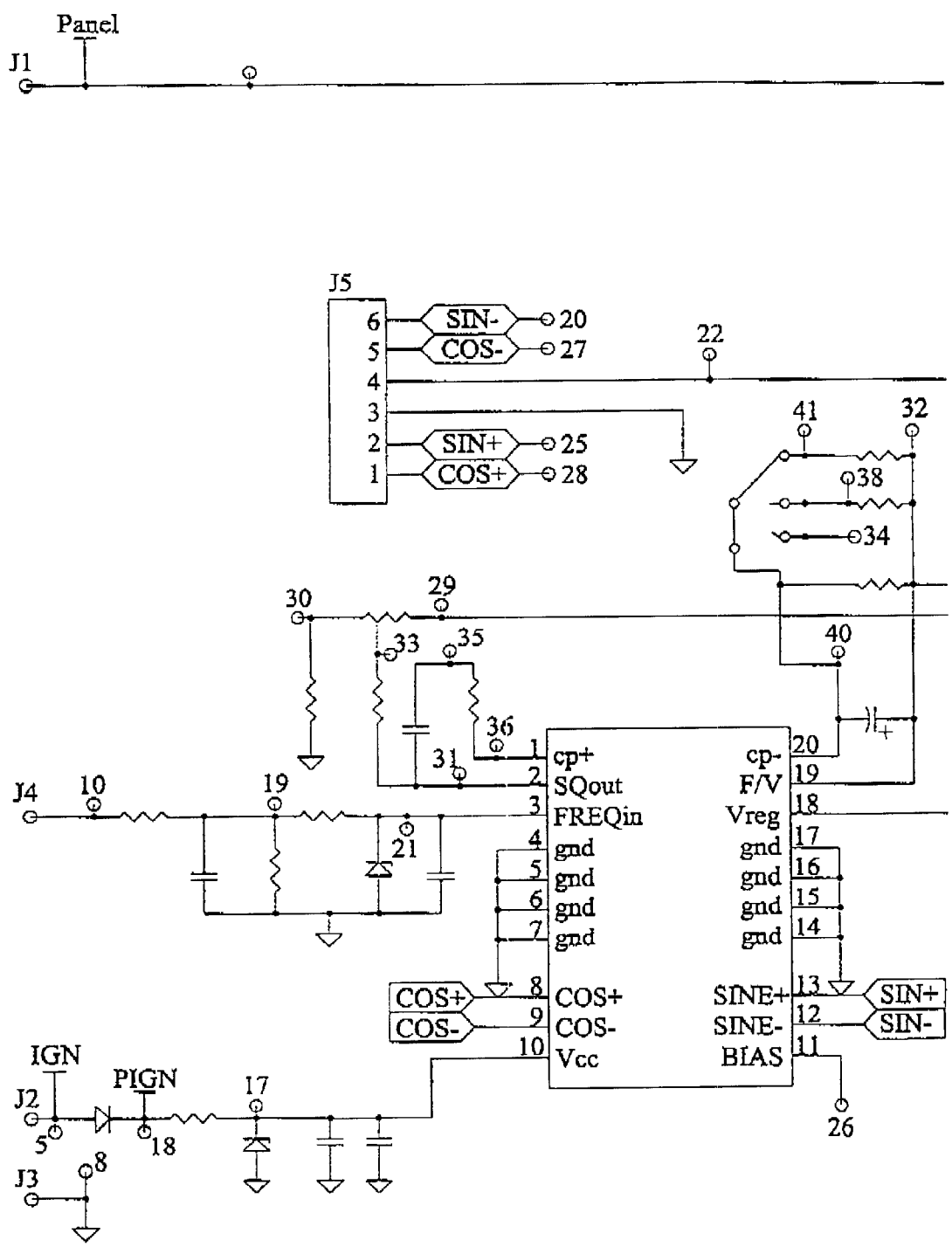
FIG. 9 is a circuit diagram of the circuitry for controlling an instrument.
Figure 9B:
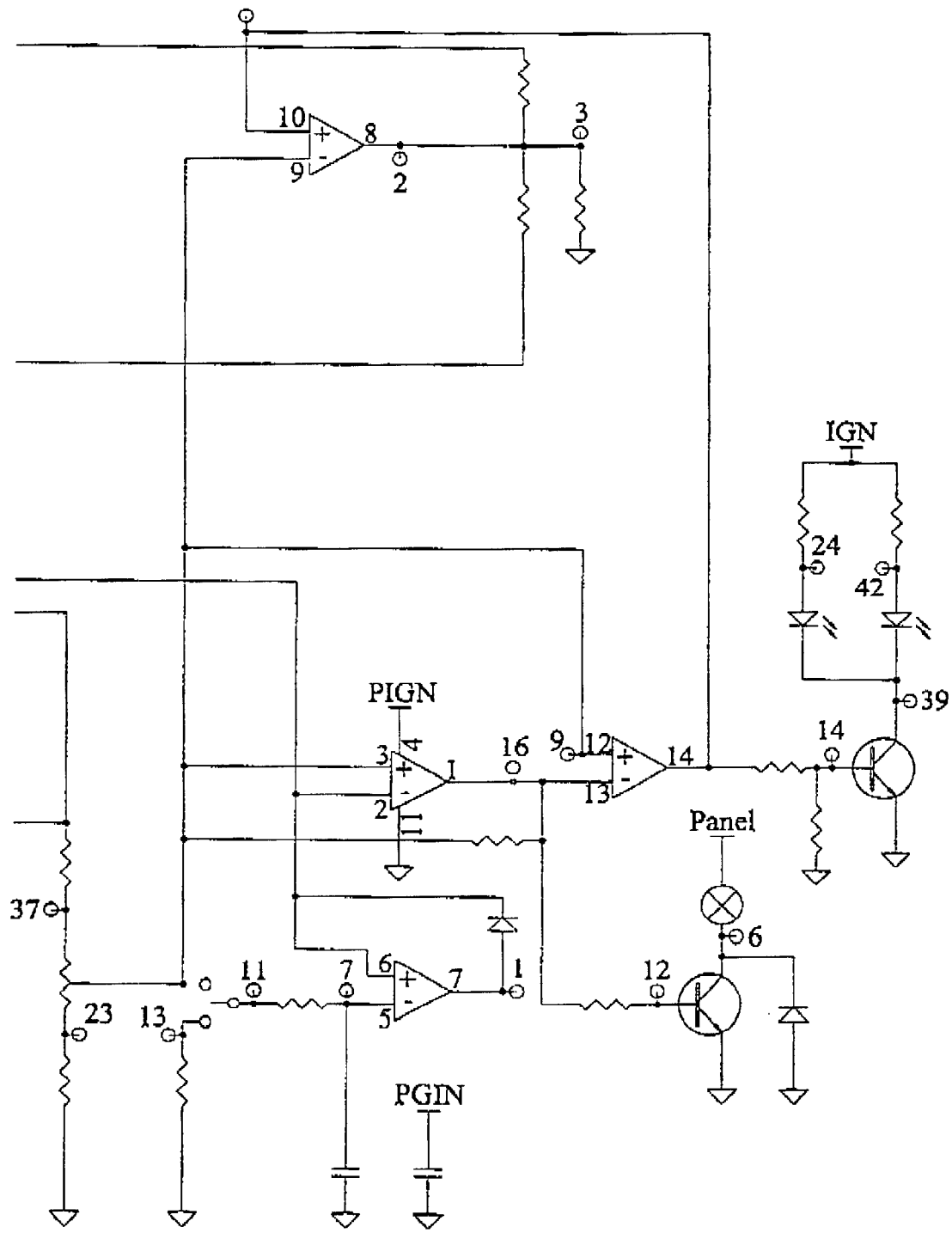

A second LED 42 is provided on circuit board 38 near the outer edge 20 of display 16 which can be activated to alert a driver to the existence of various conditions. For example, where instrument 10 is a tachometer, LED 42 can be activated when the engine exceeds a certain speed to serve as a red-line indicator. The illumination of a red LED 42 at the edge of display 16 causes the entire display to glow red in an eye-catching manner. LED 42 could also be illuminated at lower engine speeds to serve as an indication that a manual transmission should be shifted into the next higher gear. Other uses of second LED 42, such as an indication of a low fuel level, can readily be imagined. A circuit diagram showing circuitry for controlling the tachometer of the first preferred embodiment is shown in FIG. 9.

One problem encountered when using an edge-illuminated display on a vehicle dashboard at night is that some light leaks out of the display and reflects off the windshield into the driver's eyes. Light from the front of the display may travel upward to the windshield before being reflected and light from the rear of the display may reflect off the windshield and into the eyes of the driver in a similar manner. This can be distracting at best and dangerous when the reflection interfere with the driver's vision. Several approaches can be taken to address this problem of reflected light. First, as shown in FIG. 3, a hood 44 can be detachably connected to housing 12 to prevent light from reaching the windshield from the front of the display. Hood 44 snaps easily into place, and can be removed for daytime driving if desired. Next, the light emitted from the back of the display can be minimized by screen-printing black markings over the white markings on the display. This black printing does not prevent light from exiting from the front of the display, but does substantially prevent it from passing from the rear.

Because the white print of the markings lies between the black printing and the viewer, the presence of the paint is not easily noticeable, and does not substantially affect the appearance of the instrument.

Figure 10:
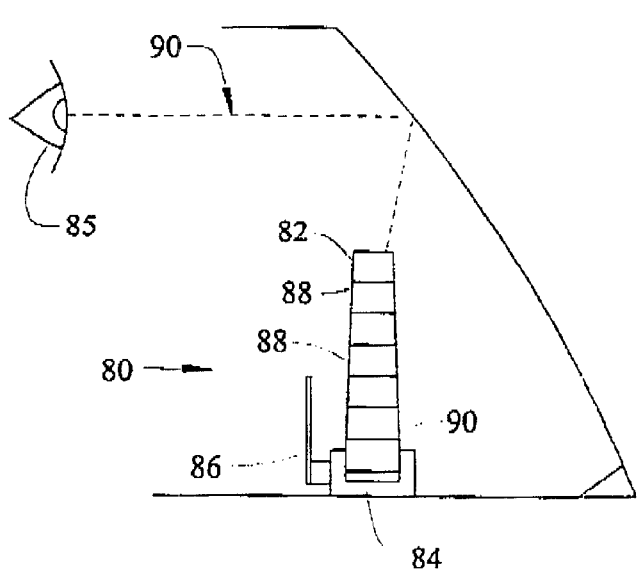
FIG. 10 is a side elevational view of an instrument according to the subject invention having parallel screens molded into the instrument display to control the angle of light leaving the display; and, FIG. 11 is a side elevational view of an instrument according to the present invention having venetian-blind-type screens mounted on the front and rear surfaces of the display to control the angle of light leaving the display.
Figure 11:
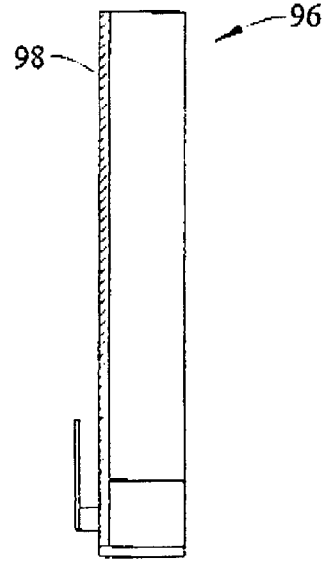

Other alternatives for controlling the direction of light emitted from the display are shown in FIGS. 10 and 11. FIG. 10 shows an instrument 80 comprising a display 82, gauge 84 and pointer 86 that further includes a plurality of fine shutter-like elements 88 formed in or attached to the front of display 82 to substantially prevent light from traveling upward from the display and reflecting off the windshield into a driver's eye 85. Path 90 in FIG. 10 shows the path that such a light ray would take if shutter elements 88 were not used. FIG. 11 shows a display 96 with thin screen elements 98 on the front thereof. These elements function in the manner of venetian blinds to control the angle at which light leaves the display. The screens can be placed on the front and rear surfaces of the display or on one side only, and a suitable screen product for use in this application is available from 3M as "Light Control Filter Polycarbonate LCF-P." Alternately, a suitable screen could be made by etching fine lines in a thin sheet of stainless steel or similar material. The use of such a screen would cut down the viewing angle of the device, and would also reduce the amount of light transmitted therethrough.

Figure 5:
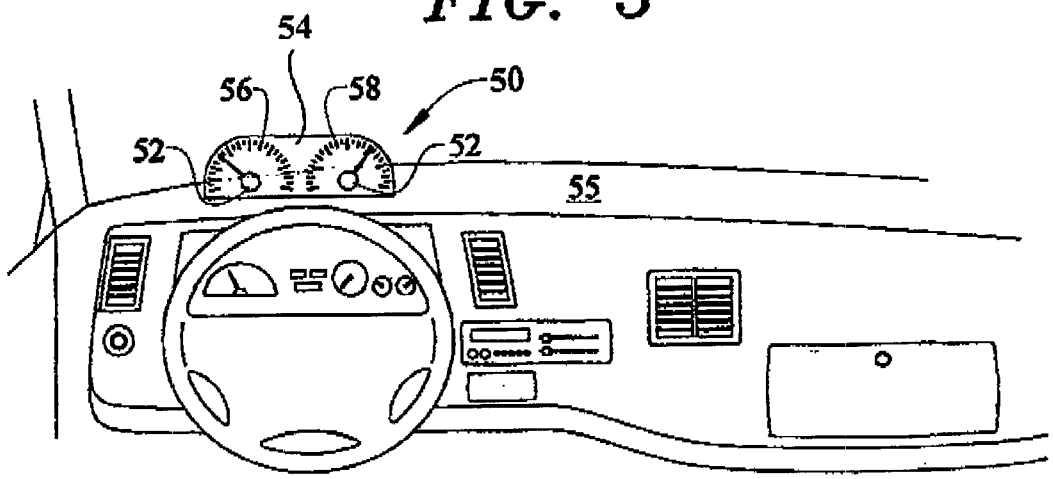
FIG. 5 is a perspective view of a second embodiment of an instrument constructed in accordance with the present invention.

A second embodiment of the subject invention is shown in FIG. 5. In this embodiment, an instrument 50 includes two separately controlled gauges 52 which extend through a display 54 having two separate sets of markings 56, 58. Significantly, this display is not contained within a housing, but instead is mounted directly to the dashboard 55 of a vehicle. In this embodiment, all parts of the instrument are transparent with the exception of the pointer and the gauge, further reducing interference with a driver's vision. Alternately, if a housing is still desired, a housing and display can be formed from the same clear material, either as two separate parts or molded as an integral unit. The housing portion can then be painted black if desired.

Figure 7:
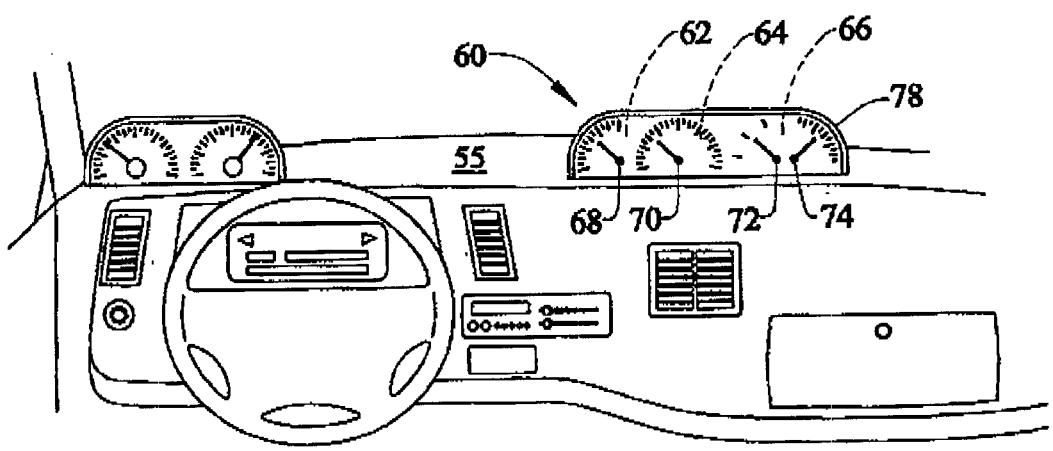
FIG. 7 is perspective view showing the instrument of FIG. 6 mounted on the dashboard of a vehicle.
Figure 6:
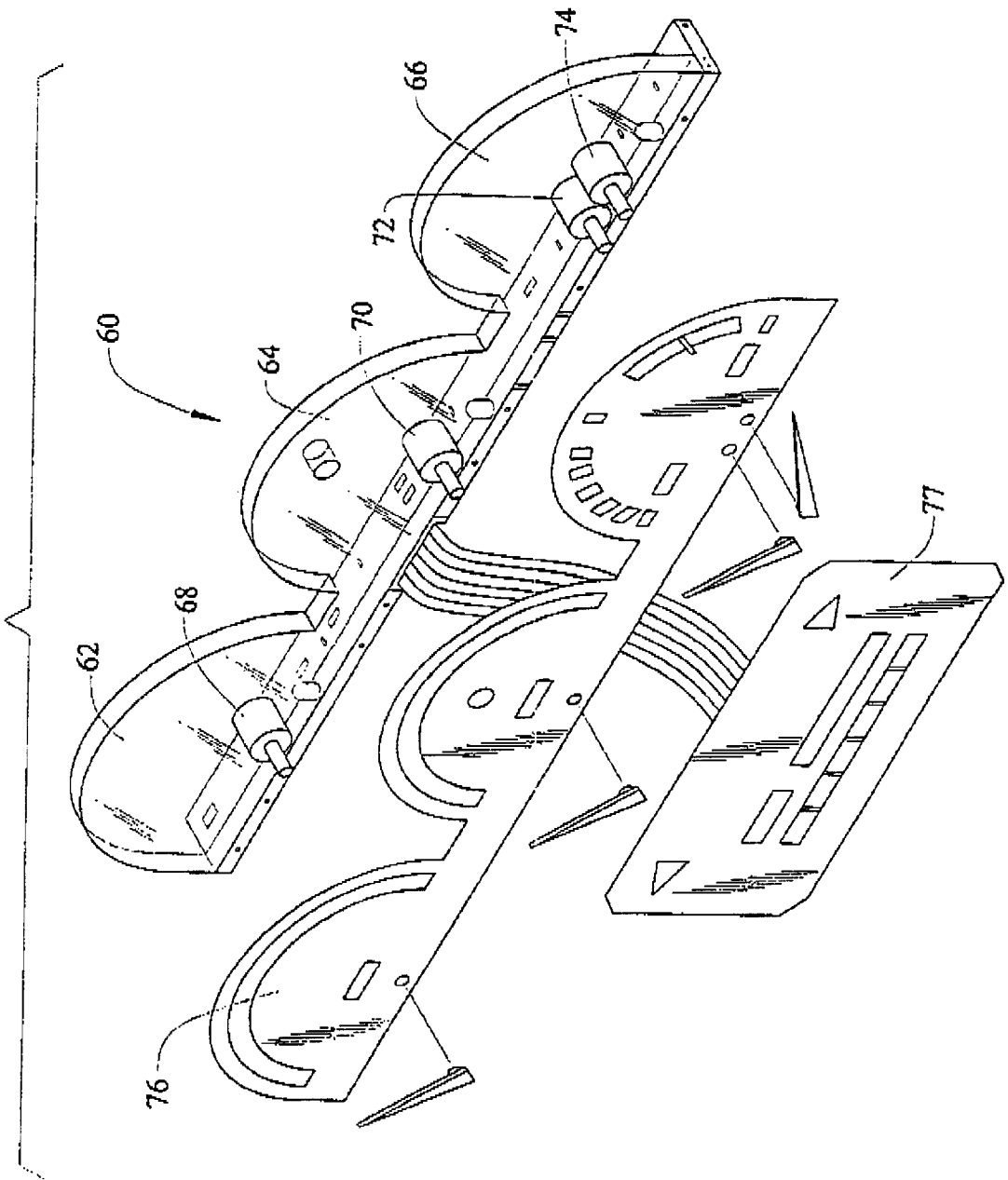
FIG. 6 is an exploded view of a third embodiment of an instrument constructed in accordance with the present invention.

A third embodiment of the subject invention is shown in FIGS. 6 and 7. In this embodiment, the display 60 comprises three separate but connected sub-displays, 62, 64, 66, each display being associated with at least one gauge to form an instrument cluster. Sub-display 62 supports a first gauge 68, sub-display 64 supports a second gauge 70, and sub-display 66 supports a pair of gauges 72, 74. These sub-displays are edge-lighted from beneath in the same manner as the displays of the previous embodiments. In addition, graphics are applied to the sub-displays using an applique 76 bearing markings for each of the gauges. In this manner, the same display can be used in connection with different arrangements of gauges merely by changing the applique applied. The system is also sufficiently versatile that it can be used in connection with a vehicle information system 77 if desired.

FIG. 7 shows the instrument cluster described above mounted on dashboard 55. FIG. 7 also shows a further method for preventing light from the back of the gauges from escaping from the display and reflecting off the windshield. As can be seen from this figure, the instrument cluster includes a housing 78 extending from the top of the display past the backs of the sub-displays to the dashboard. In this manner, the low-profile design of the instruments of the subject invention can be used in applications where transparency is not a primary consideration.

The subject invention has been described in terms of several preferred embodiments, it being understood that obvious modifications and additions to these embodiments will become apparent to persons skilled in the art upon a reading and understanding of the foregoing description. It is applicant's intention that all such modifications and additions be included within the scope of this application to the extent that they are described by the several claims appended hereto.

We claim:

1. An instrument for viewing a condition of a vehicle, said instrument comprising:

a sheet of material having a front and a back;

markings on said back of said sheet of material, said markings being visible through said front of said sheet of material;

a gauge motor disposed adjacent to said sheet of material;

a controller for receiving a signal indicative of the condition of the vehicle, said controller controlling said gauge motor based on said signal;

a pointer extending out of said gauge motor and movable by said gauge motor; and a light source disposed adjacent said sheet of material, said light source emitting light receivable by said sheet of material such that said light is reflected within said sheet of material and refracted out of said front of said sheet of material only at locations directly opposed said markings on said back of said sheet of material allowing said markings to be visible due to the refracted light exiting said sheet of material.

2. An instrument as set forth in claim 1 wherein said sheet of material is transparent.

3. An instrument as set forth in claim 2 wherein said markings are white.

4. An instrument as set forth in claim 3 including black markings covering said markings such that light passing through said markings are absorbed by said black markings.

5. An instrument as set forth in claim 4 wherein said markings that are white are applied to said sheet of material between said sheet of material and said black markings.

6. An instrument as set forth in claim 3 wherein said sheet of material is acrylic.

7. An instrument as set forth in claim 1 wherein said gauge motor extends through and is supported by said sheet of material.

8. An instrument as set forth in claim 6 including a pointer light source to emit light through said pointer as said pointer is pivoted by said gauge motor.

9. An instrument as set forth in claim 8 wherein said light source includes a plurality of light bulbs wherein each of said plurality of light bulbs emits light of a different wavelength such that each of said plurality of light bulbs can be used in different conditions to identify the different conditions.

10. An instrument as set forth in claim 1 wherein said markings are applied to said sheet of material using screen printing.

11. An instrument for viewing a condition of a vehicle, said instrument comprising:

a sheet of material having a front and a back;

markings on said back of said sheet of material;

an applique applied to said front of said sheet of material, said applique including information in locations opposite said markings on said back;

a gauge motor disposed adjacent to said sheet of material;

a controller for receiving a signal indicative of the condition of the vehicle, said controller controlling said gauge motor based on said signal;

a pointer extending out of said gauge motor and movable by said gauge motor; and a light source disposed adjacent said sheet of material, said light source emitting light receivable by said sheet of material such that said light is reflected within said sheet of material and refracted out of said front of said sheet of material through said applique only at locations directly opposed said markings on said back of said sheet of material allowing said information on said applique to be visible due to the refracted light exiting said sheet of material.

12. An instrument as set forth in claim 11 wherein said markings are white.

13. An instrument as set forth in claim 12 including black markings covering said markings such that light passing through said markings are absorbed by said black markings.

14. An instrument as set forth in claim 13 wherein said markings are applied to said sheet of material and said black markings are applied to said markings.

15. An instrument as set forth in claim 13 wherein said sheet of material is acrylic.

16. An instrument as set forth in claim 15 including a pointer light source to emit light through said pointer as said pointer is pivoted by said gauge motor.

17. An instrument as set forth in claim 15 wherein said light source includes a plurality of light bulbs wherein each of said plurality of light bulbs emits light of a different wavelength such that each of said plurality of light bulbs can be used in different conditions to identify the different conditions.

18. An instrument as set forth in claim 11 wherein said markings are applied to said sheet of material using screen printing.

\* \* \* \* \*